J. E. REDMOND.
ANTISKIDDING DEVICE FOR TIRES.
APPLICATION FILED OCT. 6, 1909.

974,825.

Patented Nov. 8, 1910.
2 SHEETS—SHEET 1.

WITNESSES

INVENTOR
James E. Redmond
BY
ATTORNEYS

J. E. REDMOND.
ANTISKIDDING DEVICE FOR TIRES.
APPLICATION FILED OCT. 6, 1909.
974,825.
Patented Nov. 8, 1910.
2 SHEETS—SHEET 2.
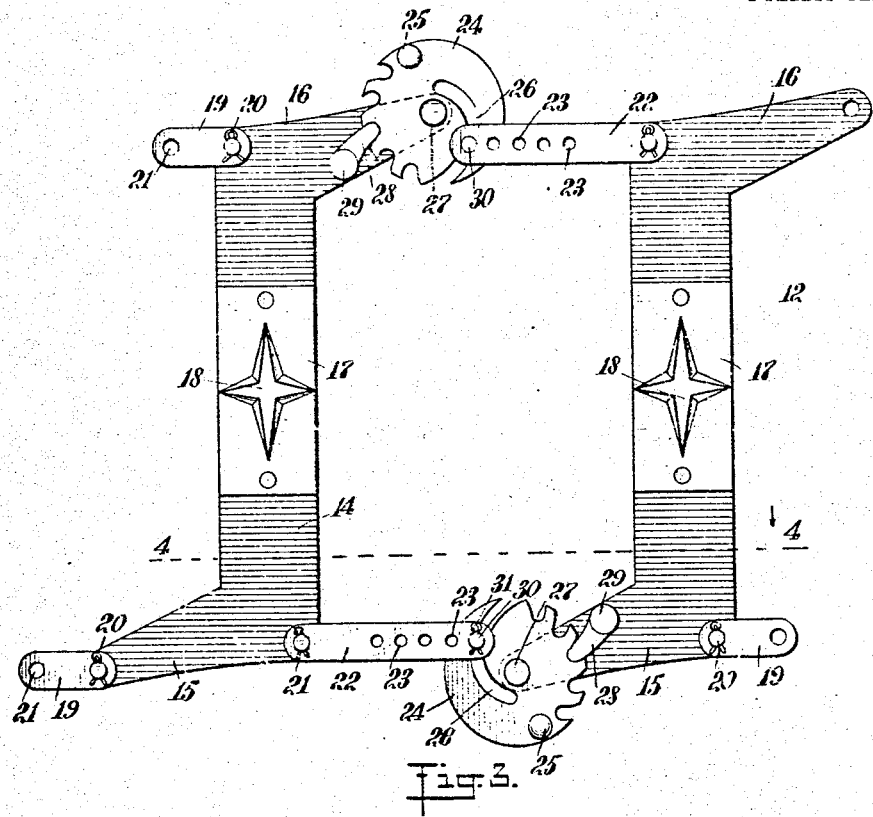
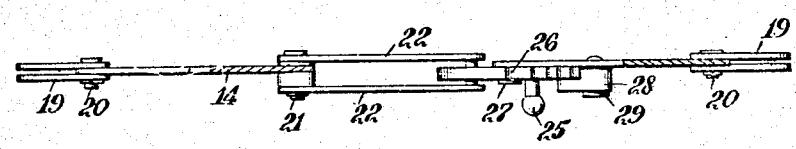
WITNESSES
INVENTOR
James E. Redmond
BY
ATTORNEYS

UNITED STATES PATENT OFFICE.

JAMES EDWARD REDMOND, OF BUTTE, MONTANA.

ANTISKIDDING DEVICE FOR TIRES.

974,825.  Specification of Letters Patent.  Patented Nov. 8, 1910.

Application filed October 6, 1909. Serial No. 521,221.

*To all whom it may concern:*

Be it known that I, JAMES E. REDMOND, a citizen of the United States, and a resident of Butte, in the county of Silverbow and State of Montana, have invented a new and Improved Antiskidding Device for Tires, of which the following is a full, clear, and exact description.

My invention relates to a device for tires on automobiles and like vehicles, to prevent the same from skidding when the wheels of the vehicle contact with a wet or slippery surface, and also prevents wear and tear of tires secured to vehicle wheels.

My invention comprehends an anti-skidding device for tires on vehicle wheels, particularly for pneumatic tires secured to automobile wheels, and resides in a series of raised shoes, secured to tread members forming links for securing the said shoes on the periphery of the tire, and adjustable means secured to the said links for compensating for any wear to which the tire may be subjected.

A further embodiment of my invention consists of an anti-skidding device for tires, adapted to be removably secured to the tire and securely held thereon by means of connecting members snugly fitted around each side of the tire.

My invention still further embodies certain novel features of construction as will be hereinafter more fully described and specified.

Reference is to be had to the accompanying drawings forming a part of this specification, in which similar characters of reference denote corresponding parts in all the views, and in which—

Figure 1:
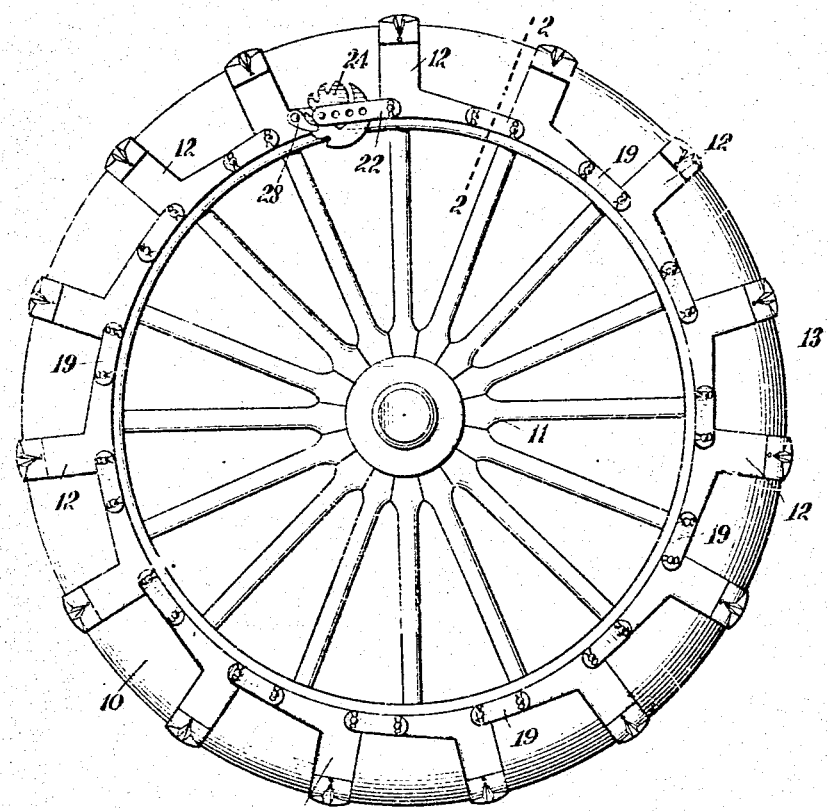
Figure 2:
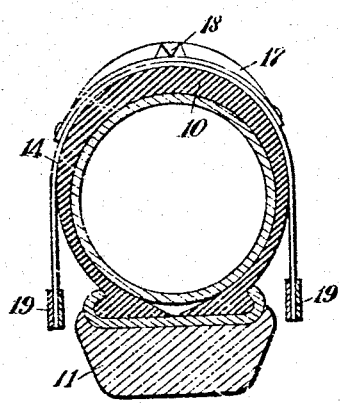

Figure 1 is a side elevation of an automobile wheel and tire, showing my invention as applied thereto; Fig. 2 is a sectional view taken on the line 2—2 in Fig. 1; Fig. 3 is a plan view of two of the anti-skidding members, comprising my invention; and Fig. 4 is a sectional view of the same taken on the line 4—4 in Fig. 3, looking in the direction of the arrow.

Removably secured to a tire 10 fastened to a wheel 11, are a number of removably connected similar link members 12, forming an anti-skidding device 13. The link members 12 comprise a tread portion 14 adapted to fit transversely around the tire 10. At either end of the tread portion 14 and integral therewith are oppositely-extending elongated link portions 15 and 16. Secured to the tread portion 14 is a shoe 17, provided with a protuberance 18, preferably star-shaped. Connecting links 19 are secured to the link members 12 by means of suitable cotter pins 20, and have therein perforations 21 for securing the same to the next link, similar to the link 12, and adapted to be connected thereto. To one end of the link member 12 by means of cotter pins 21, a perforated, elongated adjusting link 22 is secured having therein suitable perforations 23. On another end of the link member 12 a pawl and ratchet member 24, having a handle 25 thereon and provided with an eccentric slot 26, is secured to the said link member 12 by a pin 27. The pawl 28 of the pawl and ratchet member 24 is secured to the link member 12 by a pin 29.

When it is desired to secure the anti-skidding device to a tire, the numerous link members 12 being connected by the different links 19, are laid on the tire and fitted to the same so that the device extends completely around the periphery of the tire, as will be easily seen by referring to Fig. 1. To securely hold the device on the tire, the perforated elongated adjusting link 22 having a pin 30 secured by a cotter pin 31, in one of the perforations 23 of the same, is manipulated so that the pin 30 on the link engages the eccentric slot 26 on the pawl and ratchet member 24. The handle 25 on the pawl and ratchet member 24 is then grasped and turned, thereby operating the pawl and ratchet member 24, so that the said slot will pull up on the adjusting link 22 and securely hold the same, the pawl 28 and the ratchet 24 acting as locking members. There being two opposite link members each provided with a ratchet member and an adjusting member, to secure the other ends of the link members, the operation as just described is repeated, and the result can be clearly seen by referring to Figs. 1 and 3. The device is now held securely on the tire with the shoes on the outside, so as to grip the surface over which the wheel is moving and keep the same from skidding.

The wear and tear that a tire is subjected to sometimes causes the anti-skidding device to loosen, due to the decreasing circumference of the tire, and for this reason the adjusting link 22 is provided. As the tire wears down, the slack occasioned in the anti-skidding device can be quickly taken up, by removing the cotter pin 31 from the pin 30 and placing the pin 30 in one of the other perforations in the adjusting link 22, thereby shortening the anti-skidding device, the cotter pin 31 being replaced in the pin 30 to securely hold the same.

It will be noticed, by referring to Figs. 1 and 2, that the rivets used to connect the various links, are set so as to rest opposite the clencher rim of the wheel when my device is attached to the tire, thereby preventing all chance of puncturing or mutilating the tire by means of these rivets.

My device, as described, not only prevents a vehicle to which it is attached from skidding, but protects the tire from wearing out quickly.

My device can be secured or removed from a tire in a minimum of time and is readily collapsible.

Although I have described my device as attached to no particular kind of wheel or tire, it is most preferably and advantageously used on the wheels and tires of automobiles having pneumatic tires thereon, the usual policy being to attach one of my anti-skidding devices to each of the rear tires.

It will be understood that my device can be very cheaply manufactured, various parts being preferably stamped from galvanized iron or other suitable material.

My device is light in weight and can quickly be collapsed into a neat and compact package.

The quickness of removability of the different parts comprising my device permitting of very easily repairing the same, combined with durability of construction, rank my invention as an economical and practical device for commercial use.

Having thus described my invention, I claim as new and desire to secure by Letters Patent:

1. In an anti-skidding device for tires, the combination of spaced tread members extending transversely of the tire, oppositely extending link members provided at both ends of the said tread members and integral therewith, linked means connecting the said link members with the next successive tread member on both sides of the tire, and compensating members intermediate two of the said tread members for eccentrically taking up any slack in the said linked means.

2. In an anti-skidding device for tires, the combination of spaced tread members extending transversely of the tire, shoes provided with centrally disposed protuberances and longitudinally disposed on the said tread members, oppositely extending link members provided at both ends of the said tread members and integral therewith, link means connecting the said link members with the next successive tread member on both sides of the tire, and compensating members intermediate two of the said tread members for eccentrically taking up any slack in the said device.

3. In an anti-skidding device for tires, the combination of spaced tread members extending transversely of the tire, shoes longitudinally disposed on the said tread members, star-shaped protuberances centrally mounted on the said shoes, oppositely extending link members provided at both ends of the said tread members and integral therewith, linked means connecting the said link members with the next successive tread member on both sides of the tire, pawl and ratchet mechanisms provided with an eccentric slot and mounted on the said link members, extended, perforated, linked means secured to the said tread members, and projecting means adjustably secured on the said perforated means and adapted to removably engage the said slot for eccentrically compensating for any slack occasioned in the said device.

In testimony whereof I have signed my name to this specification in the presence of two subscribing witnesses.

JAMES EDWARD REDMOND.

Witnesses:
CHAS. P. TOBIN,
PATRICK O'SHEA.